Patented Aug. 27, 1946

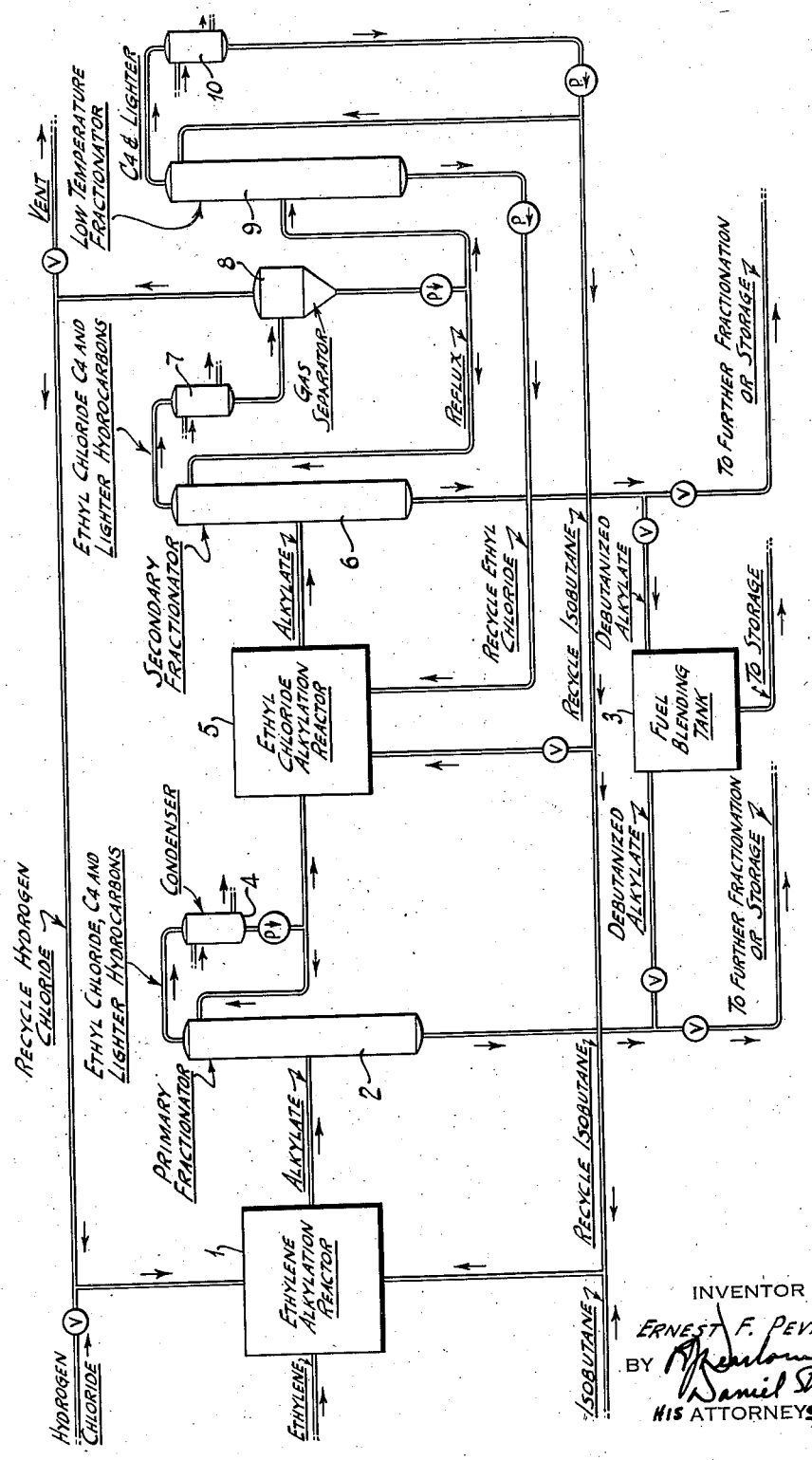

2,406,709

UNITED STATES PATENT OFFICE 2,406,709

ALKYLATION OF ISOPARAFFINS WITH ETHYLENE

Ernest F. Pevere, Beacon, N. Y., assignor to The Texas Company, New York, N. Y., a corporation of Delaware Application November 20, 1943, Serial No. 511,084

6 Claims. (Cl. 260—683.4)

My invention relates to the alkylation of isoparaffins with ethylene, and especially to an improved process for the alkylation of isobutane with ethylene in the presence of an aluminum chloride alkylation catalyst.

It has previously been proposed to alkylate isoparaffins with ethylene in the presence of an aluminum chloride alkylation catalyst which is preferably activated by a small amount of hydrogen chloride, of the order of 0.01–0.1 mol per mol of aluminum chloride. Although the alkylates obtainable by this procedure generally have high C. F. R. M. octane numbers and superior anti-knock ratings in rich mixture tests such as the A. F. D.-3C test, they do not have equally superior anti-knock ratings in supercharged engine tests under lean mixture operating conditions, for example in the A. F. D.-1C test. Thus, the alkylation of isobutane by ethylene with an aluminum chloride catalyst, in accordance with previously known methods, results in the production of alkylates consisting largely of 2,3-dimethylbutane, which has a high C. F. R. M. octane number and a high rich mixture rating by the A. F. D.-3C test. Such alkylates, however, contain little or no 2,2-dimethylbutane (neohexane), which has substantially the same C. F. R. M. octane number as 2,3-dimethylbutane, but is definitely superior in lean mixture rating by the A. F. D.-1C test.

An object of my present invention is to provide a process for the production of ethylene-isoparaffin alkylates of improved lean-mixture anti-knock characteristics.

A further object of my invention is to provide an improved process for the alkylation of isoparaffins with ethylene in the presence of an aluminum chloride alkylation catalyst, whereby substantial quantities of neoparaffins, or 2,2-dimethylalkanes, may be produced.

Another object of the present invention is to provide a process for the production of neohexane by the alkylation of isobutane with ethylene.

A still further object of my invention is to provide an improved alkylation process for the production of aviation grade motor fuels from isobutane and ethylene.

Other objects and advantages of my present invention will be apparent from the following description.

In accordance with my present invention the alkylating action of ethylene is directed toward the production of a product of neoparaffinic structure by the use of an aluminum chloride-hydrogen chloride catalyst having a concentration of hydrogen chloride much higher than the concentrations previously recommended, and by the use of a reaction temperature sufficiently high to maintain the aluminum chloride-hydrogen chloride mixture in a highly active catalytic state.

My process is adapted for use with any of the types of aluminum chloride alkylation catalysts previously employed. If hydrogen chloride is provided in the reaction zone in the concentrations herein specified, and the reaction temperature is controlled in accordance with the present disclosure, the particular form of the aluminum chloride alkylation catalyst will not materially affect the nature of the products obtained. Thus, the aluminum chloride may be employed in the form of the anhydrous solid compound per se, or supported on inert materials such as alumina, silica, kieselguhr, and the like, or in the form of liquid or solid complexes with various organic compounds such as hydrocarbons, alkyl chlorides, and the like. The particular type of aluminum chloride catalyst to be employed in any specific instance may suitably be determined by the nature of the alkylation equipment and the mechanical handling of the catalyst entailed in the operating procedure. For example, solid aluminum chloride per se is satisfactory for batch alkylation, whereas a supported catalyst is more suitable for a continuous fixed bed process, and a liquid complex is most desirable for continuous counter-current operation.

The hydrogen chloride may be introduced into the reaction zone in any manner which will provide the necessary concentration. Introduction of hydrogen chloride per se is usually the simplest and most desirable procedure. However, various equivalent methods may be used, if desired. Part, or all, of the hydrogen chloride may be evolved from the aluminum chloride by the introduction of water, by the use of a wet hydrocarbon charge stock, or by the use of ethyl alcohol as a component of the charge stock. Similarly, at reaction temperatures of about 140° F. and above, ethyl chloride may be used as an alkylating agent which simultaneously provides hydrogen chloride in the reaction mixture. Other equivalent procedures will be apparent to those skilled in the art.

The amount of hydrogen chloride provided in the reaction zone should be at least 0.5 mol per mol of aluminum chloride, and is preferably of the order of one mol per mol of aluminum chloride. The maximum amount of product of neoparaffinic structure is apparently obtainable at a HCl/AlCl$_3$ mol ratio of about 1.0. Concentrations of hydrogen chloride moderately in excess of this equimolecular ratio do not decrease unduly the amount of neoparaffinic product, but a large excess of hydrogen chloride is undesirable. In most cases, HCl/AlCl$_3$ mol ratios of 0.75–1.25 will be satisfactory, but I generally prefer to use from about 0.9 mol to about 1.1 mol of hydrogen chloride per mol of aluminum chloride.

The mol ratio HCl/AlCl₃, as used herein, signifies for batch alkylation the mols of hydrogen chloride initially introduced, plus the mols released or evolved during the reaction, divided by the average number of mols of aluminum chloride present during the reaction. Similarly, for continuous operation, this ratio signifies the mols of hydrogen chloride charged, plus the mols released or evolved, during the contact time employed for the reaction, divided by the average number of mols of aluminum chloride present in the reaction zone during said contact time.

The amount of catalyst to be employed should be at least 0.25 mol of aluminum chloride per mol of olefin charged, and is preferably about 0.35–0.40 mol per mol of olefin. These mol ratios have the same significance for batch and continuous operation as the HCl/AlCl₃ ratios discussed above. With normal paraffin/olefin charge ratios, the catalyst concentration in the reaction zone is equivalent to 10–50% by weight, based on the total hydrocarbon charge in contact with the catalyst, and is usually of the order of 15–20% by weight.

The reaction temperature will depend, to some extent, on the HCl/AlCl₃ ratio employed. Thus, a high degree of activation by hydrogen chloride, with mol ratios of 1/1 or above, will permit operation at lower temperatures than may be employed with lower mol ratios. For example, in the alkylation of isobutane, an alkylate having a substantial neohexane fraction may be produced at a temperature of 70° F. with a HCl/AlCl₃ mol ratio of 1.0, whereas a temperature of about 90° F. is required if the mol ratio is only 0.9. The optimum temperature in either case, however, is considerably higher. In general, the minimum temperature for production of a substantial neoparaffinic fraction will range from 60° F. to 100° F. depending on the HCl/AlCl₃ ratio, but the optimum range will usually be within the range 90–140° F. Temperatures above 160° F. become increasingly undesirable due to extremely high catalytic activity with resulting cracking or degradation reactions. I generally prefer, therefore, to operate within the range 90–140° F., and especially within the narrower range 100–130° F.

The reaction pressure should be sufficient to maintain a liquid hydrocarbon phase in the reaction zone, and is preferably such as to maintain substantially all of the hydrocarbon charge in the liquid phase. The pressure limits are not critical, however, and a wide range of pressures may be used as long as a liquid hydrocarbon phase is maintained in contact with the catalyst. The ethylene may suitably be introduced into the reaction zone in the gas phase, but there should be a liquid paraffinic phase in order that the reaction may take place at a liquid hydrocarbon-catalyst interface. Within the temperature range 60–160° F., pressures of 50–300 pounds per square inch will usually be satisfactory, and at temperatures of 100–130° F., I prefer to use pressures of 150–200 pounds per square inch.

The contact time may vary over a relatively wide range, and the optimum contact time will depend to some extent on the reaction temperature and the degree of activation of the catalyst. Contact times ranging from about 15 minutes to 150 minutes or more may be employed, but I prefer to use contact times of 30–60 minutes.

Other reaction conditions, such as the isoparaffin-olefin ratio and the degree of agitation of the hydrocarbon-catalyst mixture may be chosen in accordance with prior alkylation practices. Any suitable apparatus may be used, such as the conventional mixer and time tank, or the "Stratco" type reactor which provides a high rate of internal circulation. Less severe agitation may be employed with the present catalysts, and satisfactory alkylation is obtainable by bubbling the hydrocarbon charge through a column of a liquid catalyst complex. Other equivalent methods may also be used, and my invention is not to be construed as limited to any particular type of apparatus or operating procedure.

Although my catalysts are very useful for the alkylation of conventional isoparaffin-olefin mixtures, as described above, they have other characteristics which further enhance their utility. They are capable of effecting isomerization of normal paraffins in the presence of olefins, so that the alkylation charge mixture may contain a substantial proportion of normal paraffins in addition to isoparaffins. Further, my catalysts are capable of effecting alkylation by means of alkyl chlorides at temperatures of at least 140° F. A certain amount of alkyl chloride will usually be formed in alkylation with an olefin at temperatures below 140° F. when employing a high HCl/AlCl₃ ratio. The alkyl chloride thus formed may then be alkylated at a temperature above 140° F. in a second reactor containing an aluminum chloride catalyst. Hydrogen chloride will normally be evolved during the ethyl chloride alkylation at a rate sufficient to provide sufficient catalyst activation.

My catalysts are especially useful for the production of alkylates of substantial neohexane content in the alkylation of isobutane with ethylene, and my invention will be further illustrated with particular reference to this process. One modification of this preferred procedure is illustrated diagrammatically in the accompanying drawing.

Referring to the drawing, ethylene and isobutane are charged to the ethylene alkylation reactor 1, which contains a catalyst of the type previously described, which may suitably have a HCl/AlCl₃ mol ratio of about 1/1. Provision is also made for the intermittent or continuous charge of hydrogen chloride to the reactor 1, in order to maintain a substantially constant catalyst composition. The reactor 1 is maintained at a temperature below 140° F., and suitably at about 115° F. The mixture leaving this reactor is charged to the primary fractionator 2, in which light products are taken overhead, and the alkylate is obtained as a bottoms fraction. The alkylate may be charged directly to the fuel blending tank 3, or may be sent to storage tanks or to additional fractionators, not shown.

The overhead from the primary fractionator 2 contains unreacted isobutane together with lighter hydrocarbons and ethyl chloride formed in the alkylation reactor 1. This mixture is condensed in the condenser 4, and is then charged to the ethyl chloride alkylation reactor 5 which is maintained at a temperature above 140° F., suitably 150° F. The catalyst contained in reactor 5 may be of the same composition as that of reactor 1. The products leaving the reactor 5 are charged to a secondary fractionator 6 in which light materials are taken overhead and the alkylate is obtained as a bottoms fraction. This alkylate may be charged to the fuel blending tank 3 or may be otherwise treated as in the case of the bottoms from the primary fractionator 2.

The overhead from the fractionator 6 contains unreacted isobutane together with lighter hydrocarbons, unreacted ethyl chloride, and the hydrogen chloride liberated in reactor 5. This overhead passes through the condenser 7 to the gas separator 8. The light gases from the separator 8, containing the hydrogen chloride liberated in the reactor 5, may be vented or may be recycled to the reactor 1 to supply hydrogen chloride for maintaining the desired HCl/AlCl₃ ratio of the catalyst in reactor 1.

The liquid condensate taken from the bottom of the gas separator 8 comprises unreacted isobutane and ethyl chloride. This condensate is charged to the low temperature fractionator 9, in which isobutane is taken off as overhead. This isobutane is suitably liquified in the condenser 10 and recycled to the reactor 1. The bottoms fraction from fractionator 9, comprising unreacted ethyl chloride, is suitably recycled to reactor 5.

It is to be understood, of course, that the particular modification illustrated in the drawing is merely a preferred procedure and that numerous variations are within the scope of my invention. It should also be understood that the drawing is only diagrammatic, and that various valves, heat exchangers, and the like have been omitted for the sake of simplicity.

My invention will be further illustrated by the following specific examples:

*Example I*

Isobutane and ethylene in a mol ratio of about 5/1 were subjected to alkylation at 70° F. in the presence of catalysts consisting of aluminum chloride and various amounts of hydrogen chloride as shown in the table below. The total alkylate in each case was carefully fractionated, and the volume percent of the neohexane fraction (boiling range 45–55° C.) is shown in the table:

| Mol ratio HCl/AlCl₃ | Vol. per cent neohexane basis total alkylate |
| --- | --- |
| 0.00 | 3 |
| 0.27 | 5 |
| 0.93 | 6 |
| 1.00 | 16 |
| 1.16 | 9 |
| 1.40 | 3 |

*Example II*

Isobutane and ethylene in a mol ratio of about 5/1 were subjected to alkylation with a catalyst consisting of aluminum chloride and hydrogen chloride in the mol ratio HCl/AlCl₃=0.93. Various alkylations were effected at the different temperatures shown in the table below. The yield of total alkylate, the yield of neohexane, and the volume per cent of neohexane in the total alkylate obtained in each case are shown in the table:

| Temperature, ° F. | Total alkylate, weight per cent of ethylene charged | Neohexane, volume per cent of total alkylate | Neohexane, weight per cent of ethylene charged |
| --- | --- | --- | --- |
| 55 | 142 | 2 | 3 |
| 70 | 163 | 6 | 10 |
| 90 | 168 | 11 | 19 |
| 120 | 202 | 24 | 49 |
| 136 | 240 | 17 | 46 |
| 142 | 248 | 16 | 45 |

*Example III*

Isobutane and ethylene in a mol ratio of about 5/1 were subjected to alkylation at about 120° F. with a catalyst of the composition employed in Example II. The total alkylate yield, in this case was 225% by weight, and the neohexane yield was 61% by weight, based on the weight of the ethylene charged. Ethyl chloride was also recovered in an amount corresponding to approximately 31% of the weight of the ethylene charged.

Ethyl chloride alkylation was effected at 140° F. with an isobutane/ethyl chloride mol ratio of approximately 4.4, using aluminum chloride alone as the catalyst. Hydrogen chloride was evolved during the reaction in sufficient quantity to maintain the catalyst in activated condition. The yield of total alkylate, based on the weight of ethylene corresponding to the ethyl chloride reacted, was 264%, and the neohexane yield on the same basis was approximately 42%. These yields, combined with the yields of the ethylene alkylation, correspond to ultimate overall yields in two stage recycle operation of 307% by weight of total alkylate and 74% by weight of neohexane, based on the weight of ethylene charged.

The overall alkylates obtained in the above examples, or the neohexane fractions of these alkylates, constitute motor fuel blending stocks of outstanding lean mixture anti-knock characteristics. Such stocks may be blended with straight run gasolines, isopentane, and other conventional blending stocks to form aviation grade motor fuels. Tetra-ethyl lead may be used in the usual concentrations, and the rich mixture anti-knock characteristics may be improved if necessary by the addition of aromatic hydrocarbons or aromatic amines such as cymidine or xylidines.

It is to be understood, of course, that the above examples are merely illustrative, and do not limit the scope of my invention. Other paraffinic and olefinic charge stocks may be used, and the catalyst composition and reaction conditions may be varied in accordance with the foregoing description. It is also to be understood that the use of any equivalents or modifications of procedure which would be evident to those skilled in the art is included in the scope of my invention. Only such limitations should be imposed on the scope of this invention as are indicated in the appended claims.

I claim:

1. In a process in which isobutane is alkylated by ethylene in a reaction zone containing an aluminum chloride alkylation catalyst, the steps which comprise providing in said reaction zone at least 0.25 mol of aluminum chloride per mol of olefin charged and sufficient hydrogen chloride to maintain a HCl/AlCl₃ mol ratio within the range 0.75–1.25, maintaining the temperature in said reaction zone within the range 90–140° F., and correlating the temperature and HCl/AlCl₃ ratio within said ranges to effect the production of substantial neohexane which is at least 10% by volume of the total alkylate.

2. In a process in which a paraffin feed consisting essentially of isobutane is alkylated by ethylene in a reaction zone containing an aluminum chloride alkylation catalyst, the steps which comprise providing in said reaction zone at least 0.35 mol of aluminum chloride per mol of olefin charged and sufficient hydrogen chloride to maintain a HCl/AlCl₃ mol ratio within the range 0.9-1.1, maintaining the temperature in said reaction zone within the range 100-130° F., and correlating the temperature and HCl/AlCl₃ ratio within said ranges to effect the production of an alkylate containing at least 20% by volume of neohexane.

3. A cyclic process for the alklation of isobutane which comprises charging ethylene and a molar excess of isobutane to a first reaction zone containing an aluminum chloride alkylation catalyst, providing in said first reaction zone at least 0.5 mol of hydrogen chloride per mol of aluminum chloride, maintaining the temperature in said first reaction zone within the range 90-140° F., withdrawing reaction products from said first reaction zone, separating from said reaction products a normally liquid alkylate fraction and a light fraction comprising as the essential alkylatable constituents ethyl chloride and unreacted isobutane, charging said light fraction to a second reaction zone containing an aluminum chloride alkylation catalyst maintained at a temperature of 140-160° F. to effect alkylation of unreacted isobutane with a substantial proportion of said ethyl chloride with the production of hydrocarbon alkylate, withdrawing reaction products from said second reaction zone, separating from the reaction products thus withdrawn a normally liquid alkylate fraction, a lighter fraction comprising unreacted ethyl chloride, a still lighter fraction comprising unreacted isobutane, and a normally gaseous fraction comprising hydrogen chloride, recycling said ethyl chloride fraction to the second reaction zone, and recycling said isobutane fraction to said first reaction zone.

4. The process of claim 3 in which the normally gaseous fraction comprising hydrogen chloride is recycled to the first reaction zone.

5. The process of claim 3 in which the normally liquid alkylate fractions separated from the reaction products of the first and second reaction zones are combined to form a motor fuel stock.

6. In the alkylation of isobutane with ethylene in the presence of an aluminum chloride catalyst and a hydrogen chloride promoter under conditions including a substantial molar excess of isobutane to ethylene, a temperature of about 90-140° F., and a sufficiently high ratio of hydrogen chloride to aluminum chloride to produce a substantial yield of ethyl chloride in addition to hydrocarbon alkylate, the method of increasing the yield of hydrocarbon alkylate which comprises fractionating the reaction products of said isobutane-ethylene alkylation to separate a normally liquid alkylate fraction from a lighter fraction comprising as the essential alkylatable constituents ethyl chloride and unreacted isobutane, charging said lighter fraction to a separate alkylation zone and contacting the same therein with an aluminum chloride catalyst under conditions including a higher temperature of about 140-160° F. at which isobutane is alkylated with a substantial proportion of said ethyl chloride to form hydrocarbon alkylate, fractionating the resulting reaction products from said separate alkylation zone to separate a normally liquid alkylate fraction, a lighter fraction comprising unreacted ethyl chloride, and a still lighter fraction comprising unreacted isobutane, recycling said unreacted ethyl chloride to said separate alkylation zone, and recycling said isobutane fraction to the isobutane-ethylene alkylation.

ERNEST F. PEVERE.